D. F. SNEERINGER.
SHOCK ABSORBING COUPLING.
APPLICATION FILED SEPT. 29, 1910.
1,008,379.
Patented Nov. 14, 1911.
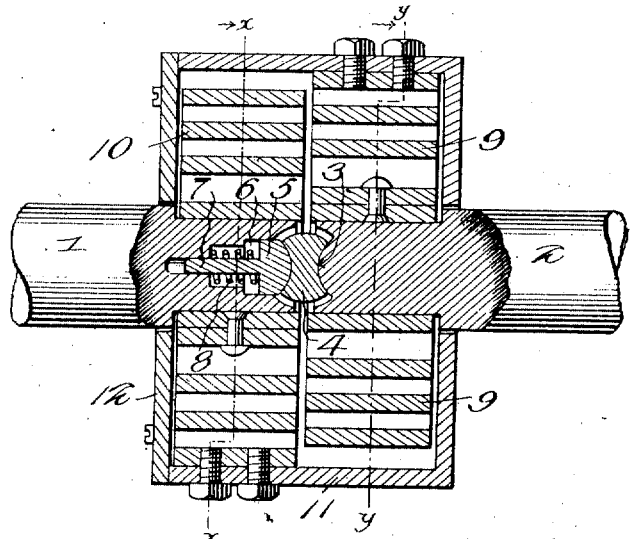
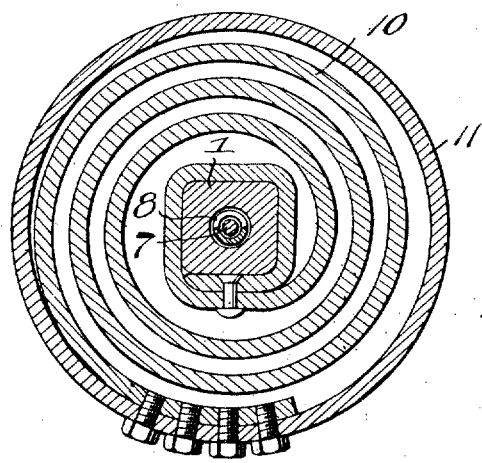
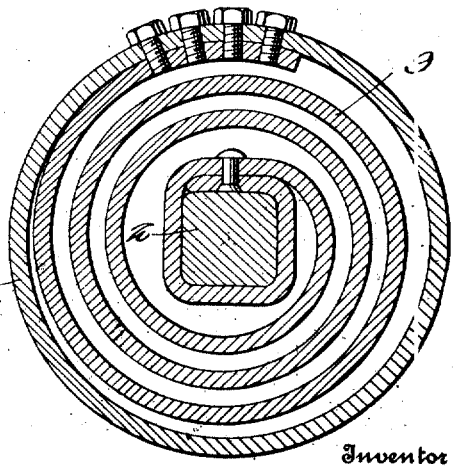
Witnesses
Hugh H. Ott
V. B. Hillyard
Inventor
David F. Sneeringer
By Victor J. Evans
Attorney

UNITED STATES PATENT OFFICE.

DAVID F. SNEERINGER, OF YORK, PENNSYLVANIA.

SHOCK-ABSORBING COUPLING.

1,008,379.     Specification of Letters Patent.     Patented Nov. 14, 1911.

Application filed September 29, 1910. Serial No. 584,521.

*To all whom it may concern:*

Be it known that I, DAVID F. SNEERINGER, a citizen of the United States, residing at York, in the county of York and State of Pennsylvania, have invented new and useful Improvements in Shock-Absorbing Couplings, of which the following is a specification.

The present invention provides means for connecting two shafts or parts of a driving shaft so that any abnormal strain may be equalized, thereby preventing injury to the motor or to the part to be driven and at the same time insuring a comparatively smooth running mechanism free from jar such as commonly experienced when the driving power suddenly takes hold of the part to be driven.

The invention provides means particularly adapted for coupling the drive shaft of an automobile to the transmission shaft, thereby enabling the machine to be started slowly without experiencing any shock or jerk and at the same time diminishing the liability of injury resulting from strain or a sudden throw of the load upon the engine.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a central sectional view of a shock absorbing coupling embodying the invention. Fig. 2 is a sectional view on the line *x—x* of Fig. 1. Fig. 3 is a detail section on the line *y—y* of Fig. 1.

Corresponding and like parts are referred to in the following description, and indicated in all the views of the drawing, by the same reference characters.

The numerals 1 and 2 designate parts of a shaft or shaft ends to be connected by means of the improved coupling. The adjacent ends of the shafts or parts 1 and 2 are reduced and made angular, as indicated most clearly in Figs. 2 and 3, to insure a tensioning of the springs mounted thereon. The extremities of the shafts are recessed and formed with rounded projections 3 between which a coupling block 4 is placed, thereby providing a universal joint. One of the rounded projections is yieldable and constitutes a block 5 which is fitted in a recess 6 formed in the end of the shaft 1. The block 5 has a stem 7 which is fitted in an axial opening formed in the shaft 1, a spring 8 mounted upon the stem 7 normally tending to press the block 5 outward against the adjacent side of the universal block 4, so as to maintain a tight joint. This construction prevents any knock in the shaft line incident to any play in the frame or other part of the machine.

A spring 9 has its inner end fitted upon the angular portion of the shaft 2 so as to turn therewith, said spring being of the coil type and preferably wound in a right hand direction. The spring 10 has its inner end fixed upon the inner portion of the shaft 1 and is wound in a left hand direction. The springs 9 and 10 may be secured at their inner ends to the respective shafts in any manner so as to turn therewith and insure the winding thereof upon turning the shafts in the proper direction. The outer ends of the springs 9 and 10 are connected in any manner, as by means of a casing 11 which encircles the springs, the casing having one side closed and the opposite side being adapted to be closed by means of a cover 12 which is held in place by machine screws or other suitable fastenings. The casing, besides connecting the outer ends of the springs, also forms a housing therefor and for the universal joint formed between the extremities of the shafts, thereby excluding dirt. Moreover, the casing may be used for receiving the lubricant to insure free movement between the parts to prevent any unusual wear.

When power is applied to one of the shafts it tends to wind the spring connected thereto and to turn the casing attached to the outer end of said spring. The other spring transmits the power from the casing to the shaft to be driven. Any sudden strain coming upon the shaft receiving the driving force is neutralized by winding the spring connected directly thereto, thereby preventing the shock being transmitted to the engine or driving means. It is to be understood that one spring supplements the action of the other, the shock however being absorbed and neutralized by the strain tending to wind the spring.

From the foregoing description, taken in connection with the accompanying drawing, the advantages of the construction and of the method of operation will be readily apparent to those skilled in the art to which the invention appertains and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention, what I claim as new is:—

1. In combination, two shaft ends having their extremities recessed and provided with rounded projections, a universal block fitted within the recesses formed in the extremities of the shafts and receiving the rounded projections, reversely wound springs secured at their inner ends to the shaft ends, and means connecting the outer ends of said springs.

2. In combination, two shaft ends, rounded projections at the extremities of the shafts, one of said rounded projections being yieldable, a universal block mounted between the two rounded projections, reversely wound springs having their extremities connected to the shaft ends, and means connecting the outer ends of said springs.

In testimony whereof I affix my signature in presence of two witnesses.

DAVID F. SNEERINGER.

Witnesses:
 JOHN J. SCHWARTZER,
 NELLIE R. CROSS.